(12) United States Patent (10) Patent No.: US 12,616,560 B2

Steger et al. (45) Date of Patent: *May 5, 2026

(54) DENTAL MACHINING SYSTEM FOR GENERATING PROCESS PARAMETERS OF THE MACHINING

(71) Applicant: DENTSPLY SIRONA Inc., York, PA (US)

(72) Inventors: Sebastian Steger, Heppenheim (DE); Oliver Nowarra, Leimen (DE); Daniel Weiss, Heddesheim (DE)

(73) Assignee: Dentsply Sirona Inc., York, PA (US)

( * ) Notice: Subject to any disclaimer, the term of this patent is extended or adjusted under 35 U.S.C. 154(b) by 759 days.

This patent is subject to a terminal disclaimer.

(21) Appl. No.: 17/911,460

(22) PCT Filed: Mar. 11, 2021

(86) PCT No.: PCT/EP2021/056134

§ 371 (c)(1),
(2) Date: Sep. 14, 2022

(87) PCT Pub. No.: WO2021/185661

PCT Pub. Date: Sep. 23, 2021

(65) Prior Publication Data

US 2023/0111090 A1 Apr. 13, 2023

(30) Foreign Application Priority Data

Mar. 20, 2020 (EP) ..................................... 20164430

(51) Int. Cl.
*G06F 3/048* (2013.01)
*A61C 13/00* (2006.01)
(Continued)

(52) U.S. Cl.
CPC ............ *A61C 13/0004* (2013.01); *B23C 3/16* (2013.01); *G05B 13/0265* (2013.01)

(58) Field of Classification Search
CPC ... A61C 13/0004; A61C 1/08; A61C 13/0022; A61C 1/0007; B23C 3/16; G05B 13/0265
See application file for complete search history.

(56) References Cited

U.S. PATENT DOCUMENTS

| | | | |
|---|---|---|---|
| 2005/0154488 A1* | 7/2005 | Esterling | ............ G05B 19/4065 |
| | | | 700/175 |
| 2009/0130634 A1 | 5/2009 | Ganley | |

(Continued)

FOREIGN PATENT DOCUMENTS

| | | |
|---|---|---|
| CA | 3174761 A1 | 9/2021 |
| CN | 1402623 A | 3/2003 |

(Continued)

OTHER PUBLICATIONS

International Search Report; PCT/EP2021/056134; Apr. 13, 2021 (completed); Apr. 20, 2021 (mailed).

(Continued)

*Primary Examiner* — Aleksey Olshannikov
(74) *Attorney, Agent, or Firm* — SCHWEGMAN LUNDBERG & WOESSNER, P.A.

(57) ABSTRACT

A dental machining system for manufacturing a dental restoration, including: a dental tool machine which includes: a dental blank holder for holding one or more dental blanks relatively movable with respect to one or more dental tools; one or more driving units each for movably holding at least one dental tool for machining the dental blanks; a determination unit for determining the type of each dental blank; an adjustment device for allowing the user to adjust the machining time, a level of quality of the dental restoration, and a level of security of the dental restoration and dental tool against machining damage. The system further includes (Continued)

a control unit which executes a trained artificial intelligence algorithm adapted to generate process parameters for the machining.

15 Claims, 1 Drawing Sheet

(51) Int. Cl.
   B23C 3/16          (2006.01)
   G05B 13/02          (2006.01)

(56)                    References Cited

U.S. PATENT DOCUMENTS

| | | | |
|---|---|---|---|
| 2009/0319068 A1 | 12/2009 | Sager | |
| 2012/0324731 A1 | 12/2012 | Gagnon et al. | |
| 2013/0282351 A1 | 10/2013 | Tank | |
| 2017/0020638 A1* | 1/2017 | Stine | A61C 13/0006 |
| 2017/0060104 A1 | 3/2017 | Genma | |
| 2018/0154485 A1 | 6/2018 | Lee et al. | |
| 2018/0158411 A1 | 6/2018 | Azizi et al. | |
| 2018/0181108 A1* | 6/2018 | Nagano | G05B 19/182 |
| 2019/0258222 A1 | 8/2019 | Karandikar | |
| 2020/0000562 A1 | 1/2020 | Wey | |
| 2021/0003992 A1* | 1/2021 | Nakamoto | G05B 19/40937 |
| 2021/0255600 A1* | 8/2021 | Faust | A61C 13/0006 |
| 2023/0004152 A1* | 1/2023 | Wunderlich | G05B 23/0229 |

FOREIGN PATENT DOCUMENTS

| | | |
|---|---|---|
| CN | 103235556 B | 8/2015 |
| CN | 115243640 A | 10/2022 |
| CN | 115243640 B | 12/2024 |
| DE | 102017203475 A1 | 9/2018 |
| EP | 1674047 A1 | 6/2006 |
| EP | 1674047 B1 | 6/2008 |
| EP | 3597143 A1 | 1/2020 |
| EP | 3881797 A1 | 9/2021 |
| EP | 4120955 A1 | 1/2023 |
| EP | 4120955 B1 | 2/2024 |
| JP | 2018041208 A | 3/2018 |
| JP | 2019139755 A | 8/2019 |
| JP | 2023520154 A | 5/2023 |
| JP | 7703558 B2 | 6/2025 |
| KR | 20220157437 A | 11/2022 |
| WO | WO-2021185661 A1 | 9/2021 |

OTHER PUBLICATIONS

Written Opinion of the International Searching Authority; PCT/EP2021/056134; Apr. 13, 2021 (completed); Apr. 20, 2021 (mailed).

Palanisamy, P. et. al.; "Prediction of tool wear using regression and ANN models in end-milling operation"; The International Journal of Advanced Manufacturing Technology; Springer, Berlin, DE vol. 37, No. 1-2; pp. 29-41; Feb. 16, 2007.

Chinese Office Action dated Jun. 8, 2024.

"Chinese Application Serial No. 202180022757.9, Office Action mailed Sep. 14, 2024", w/ English Translation, 9 pgs.

"European Application Serial No. 20164430.9, Extended European Search Report mailed Sep. 3, 2020", 10 pgs.

"European Application Serial No. 20164430.9, Noting of loss of rights pursuant to Rule 112(1) EPC mailed Apr. 12, 2022", 2 pgs.

"European Application Serial No. 21710297.9, Response to Communication pursuant to Rules 161(1) and 162 EPC filed May 7, 2023", 38 pgs.

"International Application Serial No. PCT/EP2021/056134, International Preliminary Report on Patentability mailed Sep. 29, 2022", 7 pgs.

"Japanese Application Serial No. 2022-555851, Examiners Decision of Final Refusal mailed Feb. 4, 2025", W/ machine English Translation, 5 pgs.

"Japanese Application Serial No. 2022-555851, Notification of Reasons for Refusal mailed Nov. 19, 2024", w/ machine English translation, 7 pgs.

"Japanese Application Serial No. 2022-555851, Response filed Apr. 25, 2025 to Examiners Decision of Final Refusal mailed Feb. 4, 2025", W/ English Claims, 12 pgs.

* cited by examiner

DENTAL MACHINING SYSTEM FOR GENERATING PROCESS PARAMETERS OF THE MACHINING

CROSS-REFERENCE TO RELATED APPLICATIONS

This is a National Phase application of International Application No. PCT/EP2021/056134, filed Mar. 11, 2021, which claims the benefit of and priority to European Application Ser. No. 20164430.9, filed on Mar. 20, 2020, which are herein incorporated by reference for all purposes.

TECHNICAL FIELD OF THE INVENTION

The present invention relates to a dental machining system which has a dental tool machine for manufacturing a dental restoration or a dental appliance from a dental blank by using one or more dental tools. The present invention more particularly relates to a method of generating the process parameters for machining the dental blank.

BACKGROUND OF THE INVENTION

In general, a dental machining system has a dental tool machine for machining a dental blank. The dental tool machine generally has one or more driving units each movably holding at least one dental tool for machining the dental blank. The dental tools are respectively mounted to the tool motors in the driving units. The dental tools can be exchanged after their service lifes are over. The dental blank is mounted to a dental blank holder which is relatively movable with respect to the dental tools. A control unit controls the operation of the dental machining system. Generally, a CAD/CAM software is executed, for example, on a PC which is connected to the dental tool machine. The CAD/CAM software is generally used to digitally provide construction data of the dental restoration to be manufactured. The CAD/CAM software further generates the temporal trajectory of the dental tool in the dental tool machine based on the construction data and the process parameters of the machining. Thereafter the dental blank holder and the driving units are controlled based on the temporal trajectory of the dental tool. Typically, the user inputs the type of the dental blank via the user interface of the dental tool machine. The user is usually allowed to discretely adjust via a graphical user interface of the CAD/CAM software the machining time (e.g., very fast, fast, normal), a level of quality of the dental restoration (e.g., very high, high, normal), and/or a level of security of the dental restoration and dental tool against machining damage (e.g., very high, high, normal). In complex test series, the process parameters for the dental machine tool such as the feed rate of the dental blank, the path distance of the dental tool, the feed rates of the dental tool into the material, the rotational speed of the dental tool and the like must be defined manually for each type of dental blank and, for instance, each level of quality of the dental restoration, and each level of security desired by the user.

So far, empirical values from the previous tests have been used as a basis for defining the process parameters. Based on the empirical values, the process parameters are defined for a basic setup. By means of suitable methods, e.g. statistical design of experiments (DoE), a process parameter space may be configured, which is then examined by means of real elaboration on the dental tool machine. A rough process parameter model can be derived from these results of the examination. Based on this model, process parameter combinations can then be determined which promise an advantageous behavior with regard to the above optimization variables such as the machining time, the level of quality of the dental restoration (e.g., no chipping), the level of security of the dental restoration (e.g., no damage to the dental restoration or the dental tool), the dental tool service life, and the like. The process parameter combinations must be further examined and or refined by further tests on the dental tool machine. A problem with this prior art method is that a complex series of numerous tests must be conducted for different/new type of dental blanks, different/new type of dental tool machines, different/new operating modes of the dental tool machines or different/new type of framework conditions. However, this is very time consuming and labor intensive. The experimental effort is too high when the process parameters depend in continuum on the optimization variables e.g., the dental tool wear condition, dynamics, or load.

SUMMARY OF THE INVENTION

An objective of the present invention is to overcome the problems of the prior art and to provide a dental machining system which can precisely generate process parameters of the machining for manufacturing a dental restoration/appliance.

This objective has been achieved through the dental machining system as defined in claim 1. The subject-matters of the dependent claims relate to further embodiments and developments.

DETAILED DESCRIPTION OF THE INVENTION

According to an embodiment of the present invention, the dental machining system utilizes artificial intelligence, for instance, a neural network or the like. According to the present invention, the dental machining system has a training mode and an inference mode. The inference mode will be briefly disclosed first. In the dental machining system of the present invention, in the inference mode, the control unit is further adapted to execute a trained artificial intelligence algorithm adapted to generate process parameters for the machining based on the type of the dental blank, the machining time, the level of quality of the dental restoration, and the level of security of the dental restoration and dental tool against machining damage, to calculate the temporal trajectory of the dental tool for the machining based on construction data of the dental restoration and the generated process parameters, and to control the dental blank holder and the driving units based on the calculated temporal trajectory. The process parameters comprise at least one of a rotational speed of the dental tool, feed rates of the dental tool into the material, path distance of the dental tool, limit values for machining forces and torques acting on the dental tool, feed rate of the dental blank and the like.

A major advantageous effect of the present invention is that the trained artificial intelligence algorithm conserves the knowledge relating to the process parameters used in dental machine tool resulting from past machining (or test series) in order to simplify or even replace future machining (or test series). Thereby, the test engineer is thus automatically supported in the process parameter setting by the results of all previous tests. Another major advantageous effect of the present invention is that the trained artificial intelligence algorithm can generate clearly differentiated process parameters e.g., in a continuous range thanks to the large amount of knowledge learned from the past machining (or test series). Another major advantageous effect of the present invention is that the trained artificial intelligence algorithm improves generation of the process parameters continuously based on the optimization of e.g., the machining speed vs level of quality while ensuring the level of security.

According to an embodiment of the present invention, the determination unit is further adapted to determine the type of the dental tool and the wear condition of the dental tool. In this embodiment, the type of the dental tool and the wear condition of the dental tool can be input into the dental tool machine by the user or retrieved from a data storage located directly on the dental tool and/or at a remote location, by using an RFID tag on the dental tool or the like. In this embodiment, in the inference mode, the control unit is further adapted to execute the trained artificial intelligence algorithm adapted to generate process parameters for the machining further based on the type of the dental tool and the wear condition of the dental tool. Thereby the process parameters can be generated considering such specific properties of the dental tool.

According to an embodiment of the present invention, the dental machining system further comprises a sensing unit for sensing dynamical quantities relating to the dental tool. In this embodiment, in the inference mode, the control unit is further adapted to execute the trained artificial intelligence algorithm adapted to generate process parameters for the machining further based on the sensed dynamical quantities, and to adaptively control the dental blank holder and the driving units based on the generated process parameters during the machining. The dynamical quantity may correspond to at least the position, the speed, the acceleration, the vibration of the respective dental tool, the force, the torque acting on the respective dental tool, the supply current to the dental tool motor of the respective dental tool or the sound generated by the respective dental tool. Thereby the generated process parameters can be adapted to the machining in real-time considering the dynamics of the dental tool.

According to an embodiment of the present invention, in the inference mode, the control unit is further adapted to determine a dental tool load along the temporal trajectory, to execute the trained artificial intelligence algorithm adapted to generate process parameters for the machining further based on the temporal trajectory and the determined dental tool load, and to adaptively control the dental blank holder and the driving units based on the generated process parameters during the machining. Thereby the process parameters can be generated considering the dental tool load. The dental tool load can for example be estimated based on an analysis of the course of the spatial tool trajectory.

According to an embodiment of the present invention, the adjustment means further allows the user to adjust the machining time, a level of quality of the dental restoration, and a level of security of the dental restoration and dental tool against machining damage in a discrete or alternatively in a continuous manner. Preferably 3 different parameter sets for 3 different machining modes may be discretely adjusted. Continuous adjustment may be effectuated with a software slider. Thereby the process parameters can be generated even more differentially.

In the subsequent, the training mode will be briefly disclosed. In the training mode, the dental machining system uses data derived from experimental or real manufacturing operations. A storage medium can be continually updated with such data for the training mode and serve as a database. According to an embodiment of the present invention, the dental machining system may also have a CAD/CAM module which preferably includes a computer station such as a PC that executes a CAD/CAM software. The trained artificial intelligence algorithm is preferably provided as part of the CAD/CAM module. The CAD/CAM module is preferably external to the dental tool machine and accessible through a network or the like. A plurality of different dental tool machines may use the trained artificial intelligence algorithm in the inference mode. The CAD/CAM module may be also provided as part of the dental tool machine. The present invention also provides a CAD/CAM software for implementing the above mentioned functions of the dental machining system. The CAD/CAM software has computer-readable codes for causing a computerized dental machining system to execute the functions. The CAD/CAM software is stored in a computer-readable storage medium. The storage medium may be portable or integrated. The storage medium may be located external or internal to the dental machining system. The storage medium may be accessible through a network or the like. The present invention can be applied to dental tool machines with various types of kinematical and dynamical capabilities for moving the dental blank and the dental tools.

According to an embodiment of the present invention, in the training mode, the control unit is further adapted to train the artificial intelligence algorithm for generating process parameters for the machining based on the type of the dental blank, a normalized machining time, the level of quality of the dental restoration, and the level of security of the dental restoration and the dental tool, and the process parameters used for previously completed machining. The normalized machining time is preferably determined based on the measured machining time and the construction data of the dental restoration. For instance, the normalized machining time may be obtained by dividing the measured machining time through the number of caps and/or the surface area of the dental restoration or the like. In general, the construction data implicitly or explicitly comprises such information specific to the dental restoration and can be derived for the purpose of the normalization.

According to an embodiment of the present invention, in the training mode, the control unit is further adapted to train the artificial intelligence algorithm for generating process parameters for the machining further based on the type of the dental tool and the wear conditions of the dental tool before start and/or after completion of a previously completed machining. The dental tool wear condition generally changes with the operating time thereof. Thus the cutting conditions at the beginning of the tool life are different from those at the end of the tool life. The trained artificial intelligence algorithm enables continuous process parameter tracking over the entire tool life. In this way, the quality of the resulting manufactured dental restoration can be maintained, regardless of whether a new or a used dental tool is utilized, and thus the dental tool can be optimally utilized.

According to an embodiment of the present invention, in the training mode, the control unit is further adapted to train the artificial intelligence algorithm for generating process parameters for the machining further based on the sensed dynamical quantities relating to the dental tool for a previously completed machining. Thereby, the trained artificial intelligence algorithm improves the process parameter generation based on the dynamical quantities.

According to an embodiment of the present invention, in the training mode, the control unit is further adapted to train the artificial intelligence algorithm for generating process parameters for the machining further based on the temporal trajectory of the dental tool relative to the dental blank and a determined dental tool load along the temporal trajectory for a previously completed machining. Thereby, the trained artificial intelligence algorithm improves the process parameter generation based on aspects of the dental tool load e.g., material-dependent speed reduction.

According to an embodiment of the present invention, in the training mode, the control unit is further adapted to train the artificial intelligence algorithm for generating process parameters for the machining of a new type of dental blank further based on the type of the new dental blank, the normalized machining time, the level of quality of the dental restoration, and the level of security of the dental restoration and the dental tool against machining damage, and the process parameters used for at least one completed machining of the new dental blank. Thereby, the trained artificial intelligence algorithm enables to gather new knowledge about the new material properties in just a few trials when setting the machining for that new material. And the rest results from the past knowledge of the trained artificial intelligence algorithm with other materials. Particularly in large laboratories, there is often a desire to optimize the machining processes for non-validated materials. With the present invention, the customer is provided with a means of effectively generating the processes parameters for unknown materials.

According to an embodiment of the present invention, in the training mode, the control unit is further adapted to train the artificial intelligence algorithm for generating process parameters for the machining with a new type of dental tool machine further based on the type of the new dental tool machine, the normalized machining time, the level of quality of the dental restoration, and the level of security of the dental restoration and the dental tool against machining damage, and the process parameters used for at least one completed machining with the new dental tool machine. Thereby, the trained artificial intelligence algorithm enables to learn the machining with a new machine type based on a few real experiments.

According to an embodiment of the present invention, in the training mode, the control unit is further adapted to train the artificial intelligence algorithm for generating process parameters for the machining with a new trajectory calculation algorithm further based on the change in the trajectory calculation algorithm, the normalized machining time, the level of quality of the dental restoration, and the level of security of the dental restoration and the dental tool against machining damage, and the process parameters used for at least one completed machining with the new trajectory calculation algorithm. Thereby, the trained artificial intelligence algorithm enables to learn the machining in the case of a change of the framework condition e.g., the trajectory calculation algorithm based on a few real experiments. This increases the agility of the manufacturing process.

According to an embodiment of the present invention, the level of quality of the dental restoration comprises at least one of the surface smoothness, the degree of chipping, and the precision of the dental restoration.

BRIEF DESCRIPTION OF THE DRAWING

In the subsequent description, further aspects and advantageous effects of the present invention will be described in more detail by using exemplary embodiments and by reference to the drawing, wherein FIG. 1—is partial schematic view of dental tool machine in a dental machining system of an embodiment according to the present invention.

The reference numbers shown in the drawing denote the elements as listed below and will be referred to in the subsequent description of the exemplary embodiments:

1. Dental tool machine
2. Dental blank
   2a. Shaft
3. Dental tool
4. Driving unit
   4a. Arm
   4b. Shaft
X,Y,Z: Directions FIG. 1 shows a dental machining system for manufacturing a dental restoration, comprising: a dental tool machine (1) which comprises: a dental blank holder for holding a dental blank (2) relatively movable with respect to the dental tools (3); two driving units (4) each for movably holding a dental tool (3) for machining the dental blank (2); a determination unit for determining the type of each dental blank (2); and an adjustment means for allowing the user to adjust the desired machining time, level of quality of the dental restoration, and level of security of the dental restoration and the dental tool (3) against machining damage. Each driving unit (4) has a shaft (4b) and an arm (4a) radially fixed to the shaft (4b). Each shaft (4b) can be moved in the z axis to or away from the dental blank (2) through a driving mechanism of the respective driving unit (4). Each arm (4a) can be moved around the z axis through the driving mechanism. The dental tools (3) are mounted to tool motors in the arm (4a) respectively. The dental blank (2) is joined to a shaft (2a) which can be moved along the y axis and rotated around the y axis through another driving mechanism. The dental machining system comprises a control unit. The control unit has a training mode and an inference mode. First the inference model will be described. In the inference mode, the control unit is further adapted to execute a trained artificial intelligence algorithm adapted to generate process parameters for the machining based on the type of the dental blank (2), the machining time, the level of quality of the dental restoration, and the level of security of the dental restoration and the dental tool (3) against machining damage, to calculate the temporal trajectory of the dental tool (3) for the machining based on construction data of the dental restoration and the generated process parameters, and to control the dental blank holder and the driving units (4) based on the calculated temporal trajectory. The process parameters comprise, for example, a rotational speed of the dental tool (3), feed rates of the dental tool (3) into the material, path distance of the dental tool (3), limit values for machining forces and torques acting on the dental tool (3), feed rate of the dental blank (2) and the like. The dental machining system calculates the construction data or receives it from an external source. The level of quality of the dental restoration comprises at least of one the surface smoothness, the degree of chipping, and the precision of the dental restoration.

In an embodiment, the determination unit is further adapted to determine the type of the dental tool (3) and the wear condition of the dental tool (3); and, in the inference mode, the control unit is further adapted to execute the trained artificial intelligence algorithm adapted to generate process parameters for the machining further based on the type of the dental tool (3) and the wear condition of the dental tool (3). The determination unit may use sensors such as RF sensors, touch sensors or the like, user input means and/or databases for such purpose.

In an embodiment, the dental machining system further comprises: a sensing unit for sensing dynamical quantities relating to the dental tool (3); and, in the inference mode, the control unit is further adapted to execute the trained artificial intelligence algorithm adapted to generate process parameters for the machining further based on the sensed dynamical quantities, and to adaptively control the dental blank holder and the driving units (4) based on the generated process parameters during the machining. The dynamical quantity corresponds to at least one of the position, the speed, the acceleration, the vibration of the respective dental tool (3), the force, the torque acting on the respective dental tool (3), the supply current to a dental tool motor of the respective dental tool (3) or the sound generated by the respective dental tool (3).

In an embodiment, in the inference mode, the control unit is further adapted to determine a dental tool (3) load along the calculated or sensed temporal trajectory, to execute the trained artificial intelligence algorithm adapted to generate process parameters for the machining further based on the temporal trajectory and the determined dental tool (3) load, and to adaptively control the dental blank holder and the driving units (4) based on the generated process parameters during the machining.

In an embodiment, in the inference mode, the adjustment means further allows the user to adjust the machining time, the level of quality of the dental restoration, and the level of security of the dental restoration and dental tool (3) against machining damage in a continuous manner. e.g. based on preset range. Alternatively, the user may be allowed to adjust the machining time, the level of quality of the dental restoration, and the level of security of the dental restoration and the dental tool (3) against machining damage in a discrete manner e.g. based on one or more preset values.

In the subsequent description, the training mode will be described. The training is directed to learn from the knowledge of the plurality of past machining (or test series) the optimization of a triangle of machining time, the level of quality and the level of security for different dental blank types. The knowledge may include for each past machining at least one of the process parameters including the feed rate of the dental blank (2), the path distance of the dental tool (3), the feed rates of the dental tool (3) into the material, the rotational speed of the dental tool (3), the trajectory calculation algorithm used, the parameters of the dental tool (3) load algorithm, parameters of any special treatments such as immersion, path smoothing, the type of the dental tool (3), the wear conditions of the dental tool (3) before start and/completion of the machining, the type of the dental blank (2) e.g., the material thereof, the machining time, the entire temporal trajectory of the dental tool (3) including for each point thereof the speed, the acceleration in each direction, the removed material according to a dental tool (3) load determination algorithm, the currents to the tool motors, the force and the torque acting on the dental tool (2) obtained through a sensor technology, the resulting level of quality of the dental restoration, any special occurrences like damages to the dental tool (2) or the dental restoration, the type of the dental tool machine including the kinematical and dynamical capacities. In the training mode, the control unit is further adapted to train the artificial intelligence algorithm for generating process parameters for the machining based on the type of the dental blank, a normalized machining time, the level of quality of the dental restoration, and the level of security of the dental restoration and the dental tool (3), and the process parameters used for a previously completed machining. The normalized machining time is determined based on the measured machining time and features derivable from the construction data of the dental restoration such as the number of caps and/or the surface area of the dental restoration and the like.

In an embodiment, the training is directed to learning the type and the wear condition of the dental tool (3). In this embodiment, in the training mode, the control unit is further adapted to train the artificial intelligence algorithm for generating process parameters for the machining further based on the type of the dental tool (3) and the wear condition of the dental tool (3) before start and/or after completion of a previously completed machining. The wear condition of the dental tool (3) is given as a percentage, wherein 100% indicates that the dental tool (3) is substantially new, and 0% indicates a that the dental tool (3) is completely worn.

In an embodiment, the training is directed to learning the dynamics of the dental tool (3) e.g., process forces and torques. In this embodiment, in the training mode, the control unit is further adapted to the train artificial intelligence algorithm for generating process parameters for the machining further based on the sensed dynamical quantities relating to the dental tool (3) of a previously completed machining.

In an embodiment, the training is directed to learning the dental tool (3) load. In this embodiment, in the training mode, the control unit is further adapted to train the artificial intelligence algorithm for generating process parameters for the machining further based on the temporal trajectory of the dental tool (3) relative to the dental blank (2) and the determined dental tool (3) load along the temporal trajectory of a previously completed machining.

In an embodiment, the training is directed to learning a new dental blank (2). In this embodiment, in the training mode, the control unit is further adapted to train the artificial intelligence algorithm for generating process parameters for the machining of a new type of dental blank (2) further based on the type of the new dental blank (2), the normalized machining time, the level of quality of the dental restoration, and the level of security of the dental restoration and the dental tool (3) against machining damage, and process parameters used for at least one completed machining of the new dental blank (2). For instance, for "material A" of a certain type of a dental blank (2), the training is performed with the plurality of related past machining (or test series) to generate the process parameters in a most advantageous or optimized combination. For a new "material B" of a certain type of a dental blank (2), only an orientation test in a non-optimized combination is required. The results are fed back into the trained artificial intelligence algorithm. This can directly allow to find the most advantageous, or ideally optimal combination on the basis of the correlations learned with material A and the data of the orienting test, which then only has to be validated in a final test. The time-consuming tests for the optimization with respect to material B are no longer necessary.

In an embodiment, the training is directed to learn a new dental tool machine (1). The dental tool machines (1) may vary in kinematical and dynamical capability. In this embodiment, in the training mode, the control unit is further adapted to train the artificial intelligence algorithm for generating process parameters for the machining with a new type of dental tool machine (1) further based on the type of the new dental tool machine (1), the normalized machining time, the level of quality of the dental restoration, and the level of security of the dental restoration and the dental tool (3) against machining damage, and process parameters used for at least one completed machining with the new dental tool machine (1).

In an embodiment, the training is directed to learn a new trajectory calculation algorithm. In an embodiment, in the training mode, the control unit is further adapted to train the artificial intelligence algorithm for generating process parameters for the machining with a new trajectory calculation algorithm further based on the change in the trajectory calculation algorithm, the normalized machining time, the level of quality of the dental restoration, and the level of security of the dental restoration and the dental tool (3) against machining damage, and process parameters used for at least one completed machining with the new trajectory calculation algorithm.

The invention claimed is:

1. A dental machining system for manufacturing a dental restoration/appliance comprising:
   a dental tool machine which comprises:
      a dental blank holder configured to hold one or more dental blanks relatively movable with respect to one or more dental tools;
      one or more driving units each configured to movably hold at least one dental tool for machining the one or more dental blanks; and
   a storage medium to store instructions, which when executed by the dental machining system, cause the dental machining system to:
      train an artificial intelligence algorithm to generate process parameters for the machining based on a type of the one or more dental blanks, process parameters used for a previously completed machining, and at least one of a normalized machining time, a level of quality of the dental restoration/appliance, or a level of security of the dental restoration/appliance and the at least one dental tool;
      receive, from a user, an adjustment of at least one of a machining time, the level of quality of the dental restoration/appliance, or the level of security of the dental restoration/appliance and the at least one dental tool against machining damage;
      determine a type of each of the one or more dental blanks;
      execute the trained artificial intelligence algorithm to generate process parameters for the machining based on the type of the one or more dental blanks, and at least one of the machining time, the level of quality of the dental restoration/appliance, or the level of security of the dental restoration/appliance and the at least one dental tool;
      calculate a temporal trajectory of the at least one dental tool for the machining based on construction data of the dental restoration/appliance and the generated process parameters; and
      control the dental blank holder and the one or more driving units based on the calculated temporal trajectory.

2. The dental machining system according to claim 1, wherein to determine the type of each the one or more dental blanks, the instructions cause the dental machining system to compute the type of the at least one dental tool and a wear condition of the at least one dental tool; and
   wherein to execute the trained artificial intelligence algorithm to generate process parameters, the instructions cause the dental machining system to use the type of the at least one dental tool and the wear condition of the at least one dental tool to generate process parameters.

3. The dental machining system according to claim 1, wherein the instructions cause the dental machining system to sense dynamical quantities relating to the at least one dental tool; and
   execute the trained artificial intelligence algorithm based on the sensed dynamical quantities, and adaptively control the dental blank holder and the one or more driving units based on the generated process parameters during the machining.

4. The dental machining system according to claim 1, wherein the instructions cause the dental machining system to determine a dental tool load along the temporal trajectory of the at least one dental tool, and execute the trained artificial intelligence algorithm based on the temporal trajectory and the determined dental tool load, and adaptively control the dental blank holder and the one or more driving units based on the generated process parameters during the machining.

5. The dental machining system according to claim 1, wherein the instructions cause the dental machining system to adjust at least one of the machining time, the level of quality of the dental restoration/appliance, or the level of security of the dental restoration/appliance and at least one dental tool against machining damage in a continuous manner or discrete manner.

6. The dental machining system according to claim 1, wherein the instructions cause the dental machining system to train the artificial intelligence algorithm for generating process parameters for the machining further based on the type of the at least one dental tool and a wear conditions of the at least one dental tool before start or after completion of a previously completed machining.

7. The dental machining system according to claim 1, wherein the instructions cause the dental machining system to train the artificial intelligence algorithm for generating process parameters for the machining further based on a sensed dynamical quantities relating to the at least one dental tool of a previously completed machining.

8. The dental machining system according to claim 1, wherein the instructions cause the dental machining system to train the artificial intelligence algorithm for generating process parameters for the machining further based on the temporal trajectory of the at least one dental tool relative to the one or more dental blanks and a determined dental tool load along the temporal trajectory of a previously completed machining.

9. The dental machining system according to claim 1, wherein the instructions cause the dental machining system to train the artificial intelligence algorithm for generating process parameters for the machining of a new type of dental blank further based on the type of the new dental blank, process parameters used for at least one previously completed machining of the new type dental blank, and at least one of the normalized machining time, the level of quality of the dental restoration/appliance, or the level of security of the dental restoration/appliance and the at least one dental tool against machining damage.

10. The dental machining system according to claim 1, wherein the instructions cause the dental machining system to train the artificial intelligence algorithm for generating process parameters for the machining with a new type of dental tool machine further based on the type of the new dental tool machine, process parameters used for at least one completed machining with the new type dental tool machine, and at least one of the normalized machining time, the level of quality of the dental restoration/appliance, or the level of security of the dental restoration/appliance and the at least one dental tool against machining damage.

11. The dental machining system according to claim 1, wherein the control unit is further configured to train the artificial intelligence algorithm for generating process parameters for the machining with a new trajectory calculation algorithm further based on a change in the trajectory calculation algorithm, process parameters used for at least one completed machining with the new trajectory calculation algorithm, and at least one of the normalized machining time, the level of quality of the dental restoration/appliance, or the level of security of the dental restoration/appliance and the at least one dental tool against machining damage.

12. The dental machining system according to claim 1, wherein the machining time is determined based on a measured machining time and the construction data of the dental restoration/appliance.

13. The dental machining system according to claim 1, wherein the process parameters comprise at least one of a rotational speed of the at least one dental tool, feed rates of the at least one dental tool into a material, path distance of the at least one dental tool, limit values for machining forces and torques acting on the at least one dental tool, or feed rate of the one or more dental blanks.

14. The dental machining system according to claim 1, wherein the level quality of the dental restoration/appliance comprises at least one of a surface smoothness, a degree of chipping, or a precision of the dental restoration/appliance.

15. The dental machining system according to claim 3, wherein the dynamical quantity corresponds to at least one of a position, a speed, an acceleration, a vibration of the respective dental tool, a force, a torque acting on the respective dental tool, a supply current to a dental tool motor of the respective dental tool, or a sound generated by the respective dental tool.

* * * * *